(12) United States Patent
Kim

(10) Patent No.: US 8,398,318 B2
(45) Date of Patent: Mar. 19, 2013

(54) OPENING/CLOSING ASSEMBLY FOR LIGHT PATH AND PHOTOGRAPHING APPARATUS INCLUDING THE SAME

(75) Inventor: Jong-jun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 13/042,534

(22) Filed: Mar. 8, 2011

(65) Prior Publication Data

US 2011/0222844 A1    Sep. 15, 2011

(30) Foreign Application Priority Data

Mar. 9, 2010    (KR) ........................ 10-2010-0021011

(51) Int. Cl.
*G03B 9/10* (2006.01)

(52) U.S. Cl. ...................................................... 396/493

(58) Field of Classification Search .................. 396/355, 396/357, 452, 493, 497, 456, 462
See application file for complete search history.

(56) References Cited

U.S. PATENT DOCUMENTS

| | | | | |
|---|---|---|---|---|
| 3,545,362 A | * | 12/1970 | Kiyoshi ........................ | 396/449 |
| 5,159,372 A | * | 10/1992 | Nomura et al. ............... | 396/448 |
| 5,434,714 A | * | 7/1995 | Kohmoto et al. ............. | 359/740 |
| 5,486,889 A | * | 1/1996 | Shintani ........................ | 396/448 |
| 6,164,842 A | * | 12/2000 | Ohta et al. ..................... | 396/349 |
| 6,264,380 B1 | * | 7/2001 | Omiya .......................... | 396/448 |
| 7,390,132 B2 | * | 6/2008 | Tada et al. ..................... | 396/448 |
| 2004/0212720 A1 | * | 10/2004 | Kobayashi .................... | 348/340 |
| 2006/0024049 A1 | * | 2/2006 | Ichino ........................... | 396/448 |
| 2006/0098975 A1 | * | 5/2006 | Kobayashi .................... | 396/448 |
| 2007/0047951 A1 | * | 3/2007 | Tanaka et al. ................. | 396/448 |
| 2008/0025719 A1 | * | 1/2008 | Uehara .......................... | 396/448 |
| 2011/0013279 A1 | * | 1/2011 | Kang et al. .................... | 359/511 |

FOREIGN PATENT DOCUMENTS

JP    2008-033152 A    2/2008

* cited by examiner

*Primary Examiner* — Clayton E Laballe
*Assistant Examiner* — Warren K Fenwick
(74) *Attorney, Agent, or Firm* — Drinker Biddle & Reath LLP

(57) ABSTRACT

An opening/closing assembly for a light path and a photographing apparatus including the same, comprises: a barrier base having an opening for providing the light path; a rotatable barrier installed on the barrier base for opening/closing the light path, and including an insertion portion; a first driving member disposed on the barrier base and including a first engagement groove in which the insertion portion is inserted and a functional portion on which an external force is exerted; a second driving member disposed on the barrier base and including a second engagement groove in which the insertion portion is inserted; and an elastic member for elastically connecting the first driving member and the second driving member, wherein, when the barrier is rotated, a distance between a portion of the first engagement groove contacting the insertion portion and a portion of the second engagement groove contacting the insertion portion is varied.

18 Claims, 13 Drawing Sheets

OPENING/CLOSING ASSEMBLY FOR LIGHT PATH AND PHOTOGRAPHING APPARATUS INCLUDING THE SAME

CROSS-REFERENCE TO RELATED PATENT APPLICATION

This application claims the benefit of Korean Patent Application No. 10-2010-0021011, filed on Mar. 9, 2010, in the Korean Intellectual Property Office, the disclosure of which is incorporated herein in its entirety by reference.

BACKGROUND

The invention relates to an opening/closing assembly for a light path and a photographing apparatus including the same.

Photographing apparatuses photograph a subject. Currently, photographing apparatuses such as digital still cameras, digital video cameras, and the like are widely used.

Photographing apparatuses generally include an opening/closing assembly for a light path that is called a "lens cap" and disposed on a lens barrel to protect a lens disposed in the lens barrel. In the opening/closing assembly for the light path, when a photographing apparatus is in an off state, a barrier disposed in the opening/closing assembly for the light path is closed to close the light path, and when the photographing apparatus is in an on state, the barrier disposed in the opening/closing assembly for the light path is opened to open the light path.

Since the opening/closing assembly for the light path is disposed in the photographing apparatus, the barrier should be securely opened or closed to protect the lens. Various structures that meet this requirement have been developed.

SUMMARY

The invention provides an opening/closing assembly for a light path having a simple structure, and a photographing apparatus including the same.

According to an embodiment of the invention, there is provided an opening/closing assembly for a light path, including: a barrier base having an opening for providing the light path; at least one barrier installed on the barrier base to be rotatable for opening/closing the light path, and including an insertion portion; a first driving member disposed on the barrier base and including at least one first engagement groove in which the insertion portion is inserted and a functional portion on which an external force is exerted; a second driving member disposed on the barrier base and including at least one second engagement groove in which the insertion portion is inserted; and an elastic member for elastically connecting the first driving member and the second driving member, wherein, when the at least one barrier is rotated, a distance between a portion of the first engagement groove contacting the insertion portion and a portion of the second engagement groove contacting the insertion portion is varied.

A hinge hole may be formed in one of the barrier base and the barrier, and a hinge shaft to be inserted into the hinge hole may be formed on the other one of the barrier base and the barrier.

A cross-section of the insertion portion may be oval-shaped.

The insertion portion may extend in a direction parallel to an optical axis of the light path.

The first driving member may be ring-shaped.

The second driving member may be ring-shaped.

The first driving member may include a first elastic member mounting portion, and the second driving member may include a second elastic member mounting portion, and a first end of the elastic member may be mounted on the first elastic member mounting portion, and a second end of the elastic member may be mounted on the second elastic member mounting portion.

The elastic member may be a tensile coil spring.

The distance between the portion of the first engagement groove contacting the insertion portion and the portion of the second engagement groove contacting the insertion portion when the barrier is in a closed state may be greater than that when the barrier is in an opened state.

According to another embodiment of the invention, there is provided a photographing apparatus including: a lens unit; an imaging device for receiving image light from the lens unit; a barrier base disposed in front of the lens unit and having an opening for providing a light path of the image light; at least one barrier installed on the barrier base to be rotatable for opening/closing the light path, and including an insertion portion; a first driving member disposed on the barrier base and including at least one first engagement groove in which the insertion portion is inserted and a functional portion on which an external force is exerted; a second driving member disposed on the barrier base and including at least one second engagement groove in which the insertion portion is inserted; and an elastic member for elastically connecting the first driving member and the second driving member, wherein, when the at least one barrier is rotated, a distance between a portion of the first engagement groove contacting the insertion portion and a portion of the second engagement groove contacting the insertion portion is varied.

A hinge hole may be formed in one of the barrier base and the barrier, and a hinge shaft to be inserted into the hinge hole may be formed on the other one of the barrier base and the barrier.

A cross-section of the insertion portion may be oval-shaped.

The insertion portion may extend in a direction parallel to an optical axis of the light path.

The first driving member may be ring-shaped.

The second driving member may be ring-shaped.

The first driving member may include a first elastic member mounting portion, and the second driving member may include a second elastic member mounting portion, and a first end of the elastic member may be mounted on the first elastic member mounting portion, and a second end of the elastic member may be mounted on the second elastic member mounting portion.

The elastic member may be a tensile coil spring.

The distance between the portion of the first engagement groove contacting the insertion portion and the portion of the second engagement groove contacting the insertion portion when the barrier is in a closed state may be greater than that when the barrier is in an opened state.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
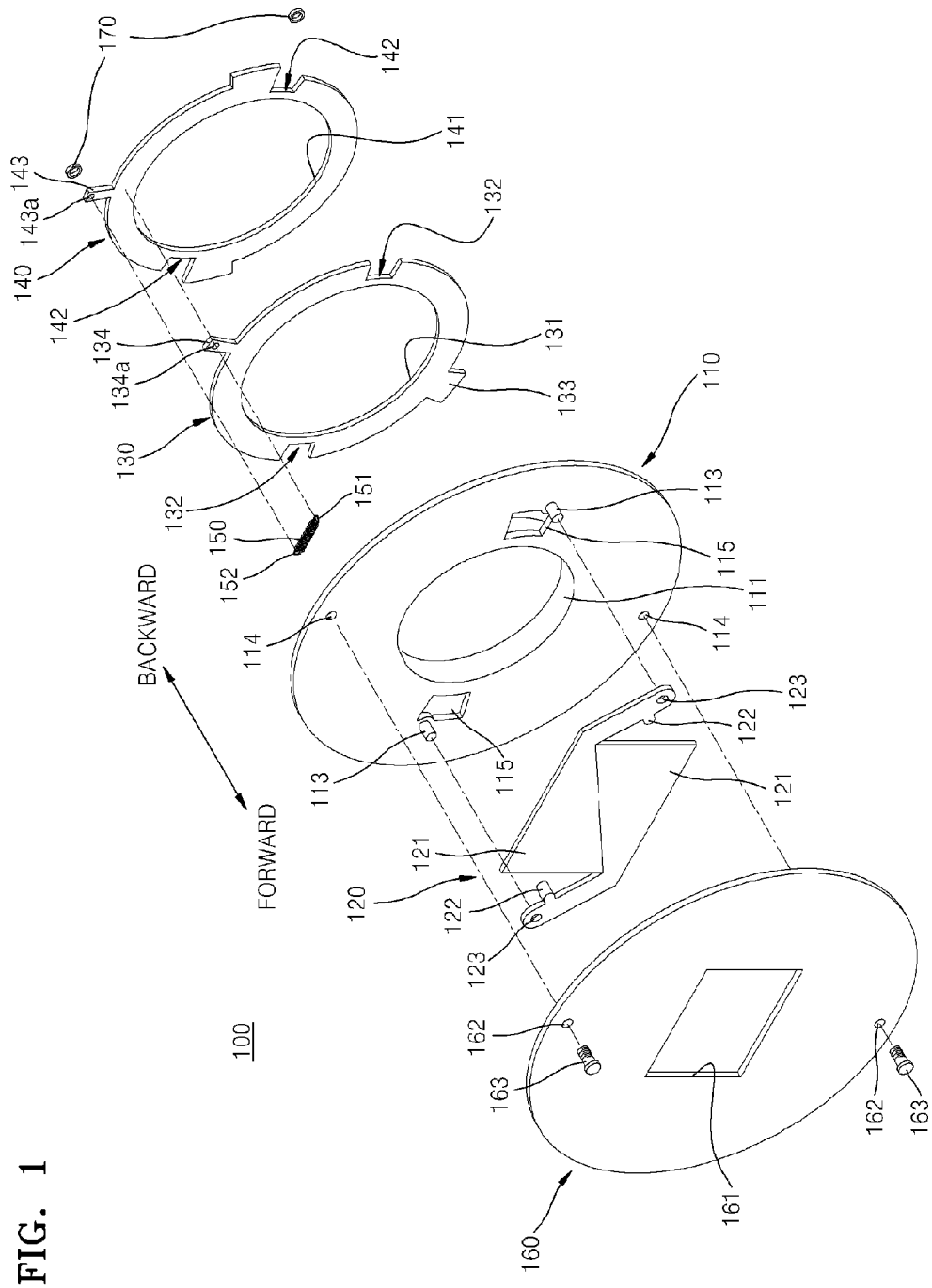
FIG. 1 is an exploded perspective view of an opening/closing assembly for a light path, according to an embodiment of the invention.

Hereinafter, the invention will be described in detail by explaining exemplary embodiments of the invention with reference to the attached drawings. Those components having substantially the same structures are rendered the same reference numeral regardless of the figure number, and redundant explanations are omitted.

Figure 2:
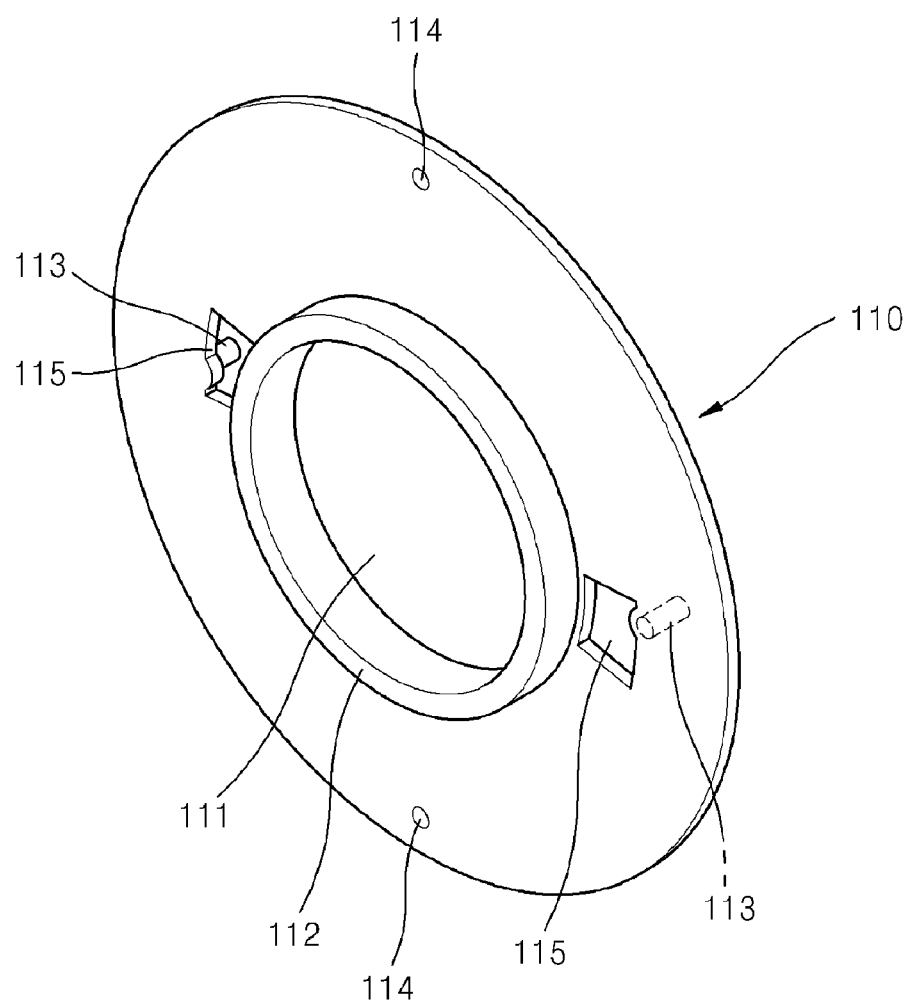
FIG. 2 is a perspective view illustrating a rear side of a barrier base of the opening/closing assembly for the light path of FIG. 1, according to an embodiment of the invention.
Figure 3:
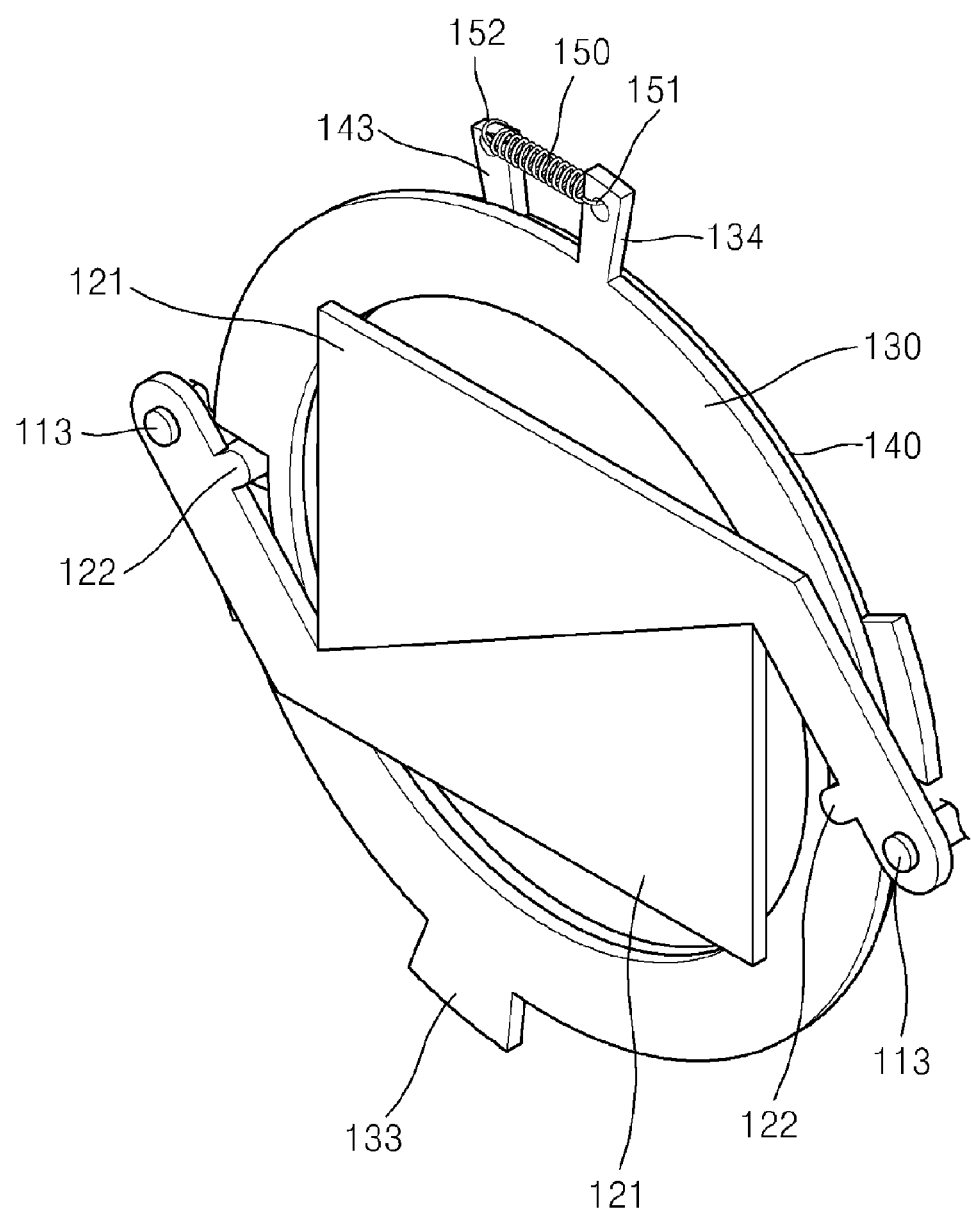
FIG. 3 is a schematic perspective view of an arrangement of elements other than the barrier base and a front panel of the opening/closing assembly for the light path of FIG. 1, according to an embodiment of the invention.
Figure 4:
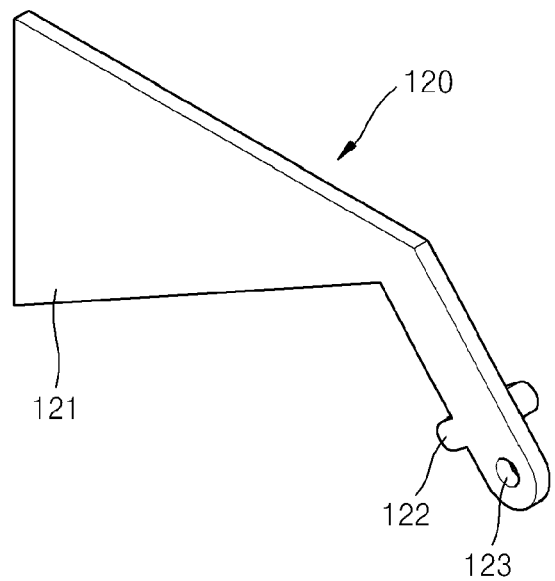
FIG. 4 is a front perspective view of a barrier of the opening/closing assembly for the light path of FIG. 1, according to an embodiment of the invention.
Figure 5:
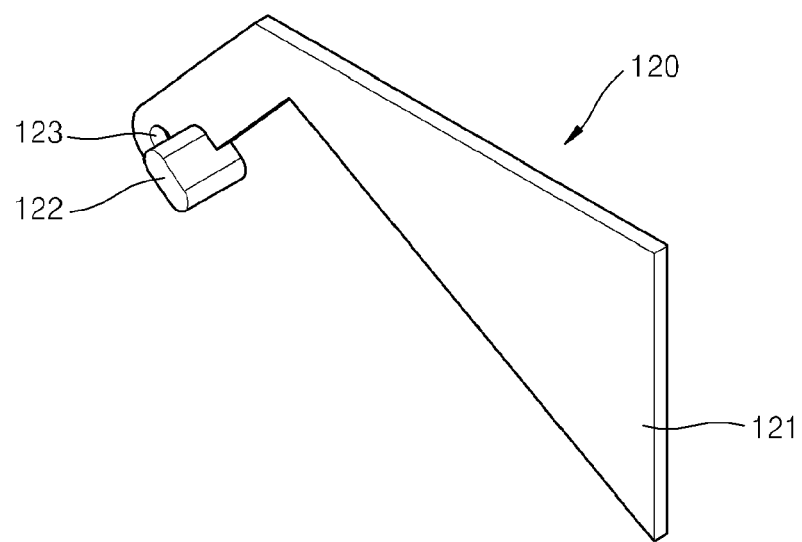
FIG. 5 is a rear perspective view of the barrier of FIG. 4.
Figure 6:
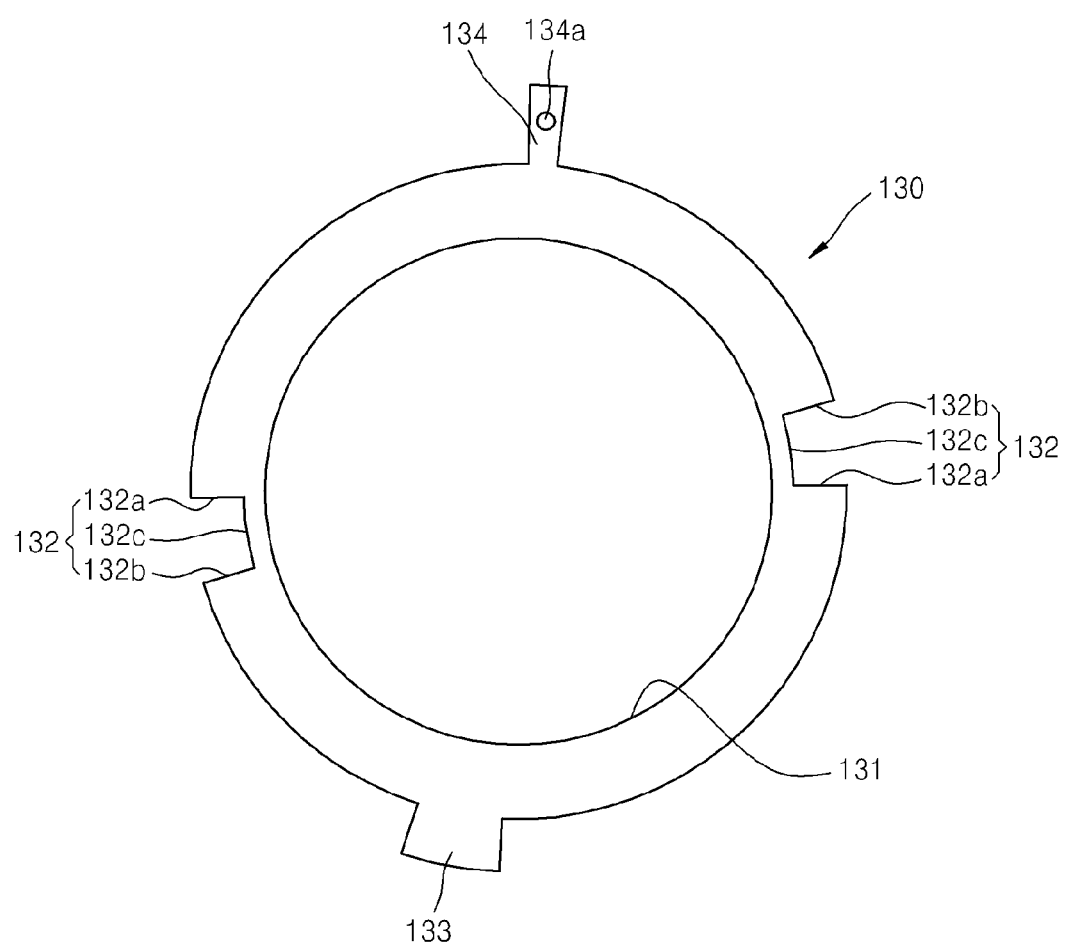
FIG. 6 is a plan view of a first driving member of the opening/closing assembly for the light path of FIG. 1, according to an embodiment of the invention.
Figure 7:
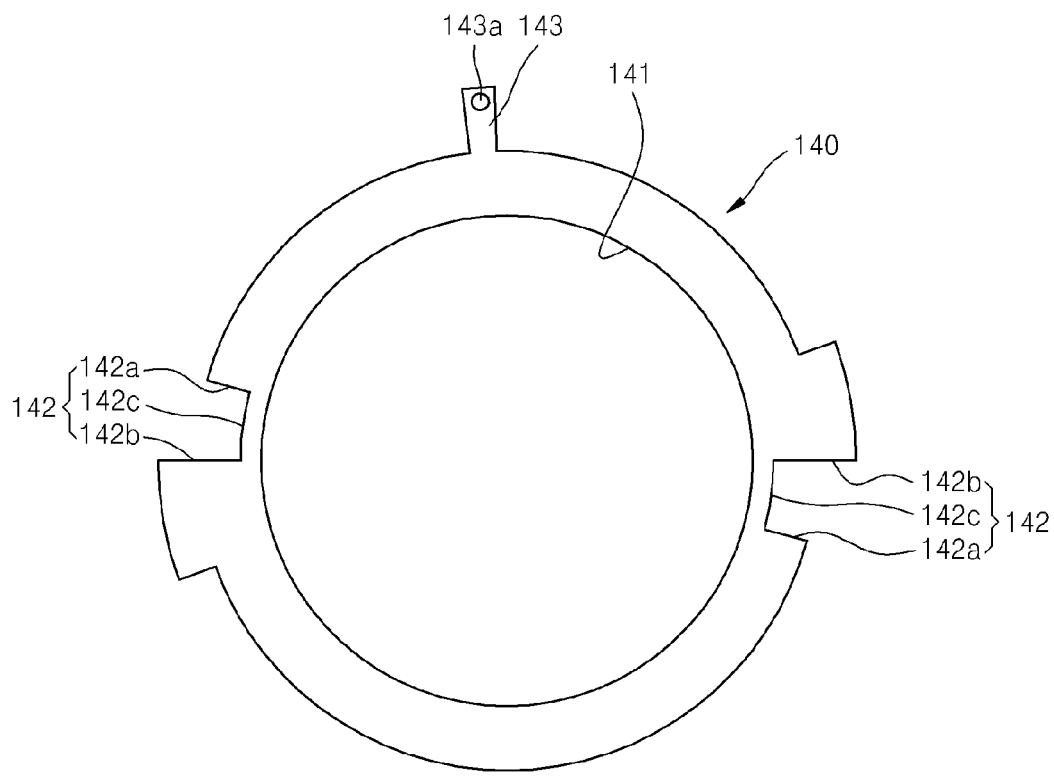
FIG. 7 is a plan view of a second driving member of the opening/closing assembly for the light path of FIG. 1, according to an embodiment of the invention.
Figure 8:
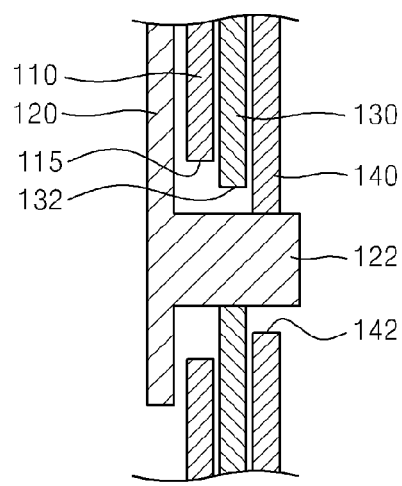
FIG. 8 is a cross-sectional view illustrating an insertion portion of the barrier of FIG. 4 inserted in a through hole, a first engagement groove, and a second engagement groove, according to an embodiment of the invention.

FIG. 1 is an exploded perspective view of an opening/closing assembly 100 for a light path, according to an embodiment of the invention. FIG. 2 is a perspective view illustrating a rear side of a barrier base 110 of the opening/closing assembly 100, according to an embodiment of the invention. FIG. 3 is a schematic perspective view of an arrangement of elements other than the barrier base 110 and a front panel 160 of the opening/closing assembly 100, according to an embodiment of the invention. FIG. 4 is a front perspective view of one barrier 120 of the opening/closing assembly 100, according to an embodiment of the invention. FIG. 5 is a rear perspective view of the barrier 120. FIG. 6 is a plan view of a first driving member 130 of the opening/closing assembly 100, according to an embodiment of the invention. FIG. 7 is a plan view of a second driving member 140 of the opening/closing assembly 100, according to an embodiment of the invention. FIG. 8 is a cross-sectional view illustrating one of insertion portions 122 of the barrier 120 inserted in a through hole 115, one of first engagement grooves 132, and one of second engagement grooves 142, according to an embodiment of the invention.

Referring to FIG. 1, the opening/closing assembly 100 according to the current embodiment of the invention includes the barrier base 110, two barriers 120, the first driving member 130, the second driving member 140, an elastic member 150, and the front panel 160.

The barrier base 110 functions as a frame in which the barriers 120, the first driving member 130, the second driving member 140, and the front panel 160 are disposed. The barrier base 110 is disc-shaped.

An opening 111 is formed in a middle portion of the barrier base 110, and the light path is formed through the opening 111.

The barrier base 110 is interposed between the front panel 160 and the first driving member 130. However, embodiments of the invention are not limited thereto. In other words, the position of the barrier base 110 is not limited. In detail, the barrier base 110 may be disposed in any position near where the barriers 120, the first driving member 130, and the second driving member 140 are disposed. For example, the barrier base 110 may be disposed behind the second driving member 140 or may be interposed between the first driving member 130 and the second driving member 140.

Also, as illustrated in FIG. 2, a rotation guide portion 112 is disposed at the rear side of the barrier base 110, surrounds the opening 111, and guides rotational movement of the first driving member 130 and the second driving member 140. The rotational guide portion 112 protrudes from the rear side of the barrier base 110 to a predetermined height so that the first driving member 130 and the second driving member 140 may be inserted onto the rotational guide portion 112 and the rotational guide portion 112 may guide the rotational movement of the first driving member 130 and the second driving member 140.

Also, two hinge shafts 113 on which the barriers 120 rotate are disposed at a front side of the barrier base 110.

Also, two mounting holes 114 for mounting the front panel 160 are formed in the barrier base 110, and the through hole 115 is also formed in the barrier base 110. The insertion portions 122 of the barriers 120 may penetrate through the through holes 115 and the through hole 115 may be shaped in such a way that the barrier base 110 does not interfere with movement of the insertion portions 122. The size of the through hole 115 may be such that the barrier base 110 does not interfere with movement of the insertion portions 122. In detail, the size and shape of the through hole 115 may not interfere with movement of the insertion portions 122.

The pair of barriers 120 opens or closes the light path through rotational movement. In this case, the pair of barriers 120 move simultaneously for opening or closing the light path. In detail, when the barriers 120 are opened to open the light path or the barriers 120 are closed to close the light path, the pair of barriers 120 simultaneously move symmetrically with respect to each other.

Each of the barriers 120 includes a light blocking portion 121 for opening/closing the light path and one insertion portion 122 for controlling movement of the light blocking portion 121, as illustrated in FIGS. 4 and 5. Also, a hinge hole 123 is formed in each of the barriers 120 and allows rotational movement of the barriers 120.

The light blocking portion 121 is formed to correspond to the opening 111 of the barrier base 110 and performs a function of blocking the light path.

The insertion portions 122 are inserted in the first driving member 130 and the second driving member 140. The insertion portions 122 are column-shaped and have an oval cross-section.

The insertion portions 122 extend in a direction parallel to an optical axis of the light path and have a length at which the insertion portions 122 may be simultaneously inserted in the through hole 115 of the barrier base 110, the first engagement grooves 132 of the first driving member 130, and the second engagement grooves 142 of the second driving member 140.

The hinge hole 123 is formed on a side of each barrier 120. The hinge shafts 113 of the barrier base 110 are inserted into the hinge holes so that the barriers 120 may be installed on the barrier base 110 and may be rotated around the barrier base 110.

According to the present embodiment, the hinge holes 123 are formed in the sides of the barriers 120, and the hinge shafts 113 are formed on the barrier base 110. However, embodiments of the invention are not limited thereto. In detail, contrary to this, the hinge holes 123 may be formed in the barrier base 110 and the hinge shafts 113 may be formed on the barriers 120.

The insertion portions 122 are column-shaped and have an oval cross-section and are disposed adjacent to the hinge holes 123. However, embodiments of the invention are not limited thereto. In detail, the shape and arrangement of the insertion portions 122 may be designed in such a way that, when the barriers 120 are rotated, a distance between portions of the first engagement grooves 132 contacting the insertion portions 122 and portions of the second engagement grooves 142 contacting the insertion portions 122 may be varied, and there are no other limitations.

As illustrated in FIG. 6, the first driving member 130 is ring-shaped and includes a circular hole 131 formed in a middle portion of the first driving member 130 and the first engagement grooves 132, a functional portion 133, and a first elastic member mounting portion 134 formed on edge portions of the first driving member 130.

The circular hole 131 is inserted onto the rotational guide portion 112 of the barrier base 110 and the first driving member 130 may be rotated a predetermined angle.

Two first engagement grooves 132 are formed symmetrically with respect to the middle portion of the first driving member 130. The insertion portions 122 of the barriers 120 are inserted into the first engagement grooves 132, respectively.

Each of the first engagement grooves 132 includes three sides. As illustrated in FIG. 6, each first engagement groove 132 includes a first side 132a, a second side 132b that faces the first side 132a, and a third side 132c that connects the first side 132a and the second side 132b to each other.

In the present embodiment, regardless of whether the barriers 120 are opened or closed, the insertion portions 122 contact the first sides 132a. However, embodiments of the invention are not limited thereto. In detail, the insertion portions 122 may be designed to contact the second sides 132b. In such a case, a contact structure of the insertion portions 122 and the second engagement grooves 142 should be re-designed according to a contact structure of the insertion portions 122 and the second sides 132b.

A cam member (not shown) in a photographing apparatus 200 (see FIG. 16) exerts force on the functional portion 133, and the functional portion 133 has a protruded shape.

A mounting hole 134a is formed in the first elastic member mounting portion 134, and a first end 151 of the elastic member 150 is mounted on the first elastic member mounting portion 134 via the mounting hole 134a.

Referring to FIG. 7, the second driving member 140 is ring-shaped and is disposed behind the first driving member 130. The second driving member 140 includes a circular hole 141 formed in a middle portion of the second driving member 140, the second engagement grooves 142, and a second elastic member mounting portion 143 formed in on edge portions of the second driving member 140.

The circular hole 141 is inserted onto the rotational guide portion 112 of the barrier base 110 and the second driving member 140 may be rotated a predetermined angle.

Two second engagement grooves 142 are formed symmetrically with respect to the middle portion of the second driving member 140. The insertion portions 122 of the barrier 120 are inserted into the second engagement grooves 142, respectively.

Each of the second engagement grooves 142 includes three sides. As illustrated in FIG. 7, each second engagement groove 142 includes a first side 142a, a second side 142b that faces the first side 142a, and a third side 142c that connects the first side 142a and the second side 142b to each other.

In the present embodiment, regardless of whether the barriers 120 are opened or closed, the insertion portions 122 contact the second sides 142b. However, embodiments of the invention are not limited thereto. In detail, the insertion portions 122 may be designed to contact the first sides 142a. In such a case, a contact structure of the insertion portions 122 and the first engagement grooves 132 should be re-designed according to a contact structure of the insertion portions 122 and the first sides 142a.

A mounting hole 143a is formed in the second elastic member mounting portion 143, and a second end 152 of the elastic member 150 is mounted on the second elastic member mounting portion 143 via the mounting hole 143a.

In the present embodiment, the second driving member 140 is disposed behind the first driving member 130. However, embodiments of the invention are not limited thereto. In detail, the second driving member 140 may be disposed in front of the first driving member 130.

The elastic member 150 is a tensile coil spring. However, embodiments of the invention are not limited thereto. In detail, beside a tensile coil spring, any member that is tensile and that may exert an elastic force may be applied to the invention. For example, the elastic member 150 may be a rubber band, a synthetic resin member having elasticity, or the like.

The first end 151 of the elastic member 150 is mounted in the mounting hole 134a of the first elastic member mounting portion 134, and the second end 152 of the elastic member 150 is mounted in the mounting hole 143a of the second elastic member mounting portion 143, so that the first driving member 130 and the second driving member 140 may be elastically connected to each other.

However, embodiments of the invention are not limited thereto. In detail, there are no limitations as long as the first end 151 of the elastic member 150 is mounted in the mounting hole 134a of the first elastic member mounting portion 134 and the second end 152 of the elastic member 150 is mounted in the mounting hole 143a of the second elastic member mounting portion 143. For example, instead of the mounting holes 134a and 143a respectively formed in the first elastic member mounting portion 134 and the second elastic member mounting portion 143, mounting protrusions may be formed therein, and the first end 151 and the second end 152 of the elastic member 150 may be mounted via the mounting protrusions, respectively.

In the present embodiment, a single elastic member 150 is used. However, embodiments of the invention are not limited thereto. In detail, a plurality of elastic members 150 may be used.

The front panel 160 is disposed in front of the barrier base 110 and includes a light incidence hole 161 formed in a middle portion of the front panel 160 and installation holes 162 formed in edge portions of the front panel 160 and through which the front panel 160 is fixed to the barrier base 110.

The front panel 160 covers the barriers 120, the first driving member 130, and the second driving member 140 and prevents them from escaping from the opening/closing assembly 100 for the light path. To this end, a pair of bolts 163 is passed through the installation holes 162 and the mounting holes 114 and the front panel 160 may be fixed to the barrier base 110 by securing nuts 170 over the barrier base 110 and onto the bolts 163.

Hereinafter, an operation of opening/closing the opening/closing assembly 100 for the light path according to the invention will be described with reference to FIGS. 9 through 15. For convenience of explanation, FIGS. 9 through 15 do not illustrate the barrier base 110 and the front panel 160 of the opening/closing assembly 100 for the light path of FIG. 1.

Figure 9:
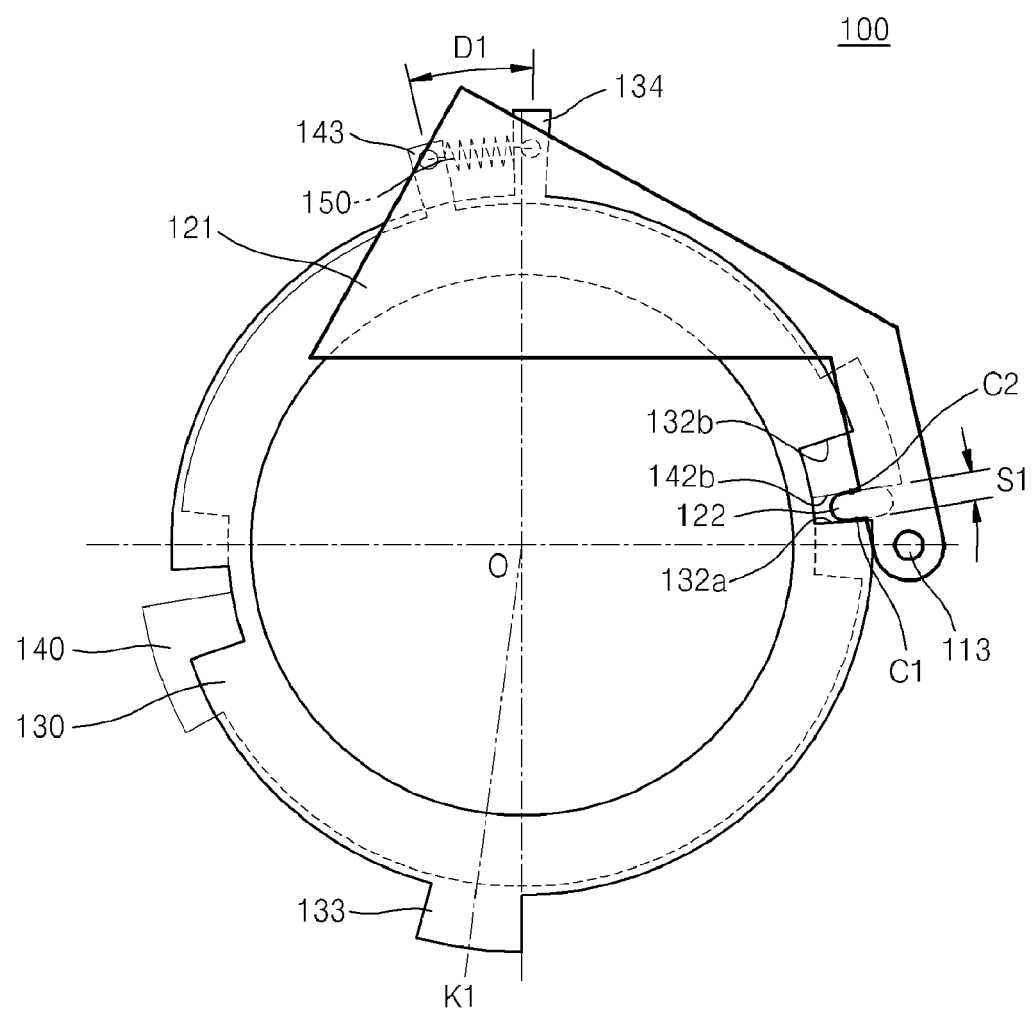
FIG. 9 is a plan view of the barrier of FIG. 4 in an opened state, according to an embodiment of the invention.
Figure 10:
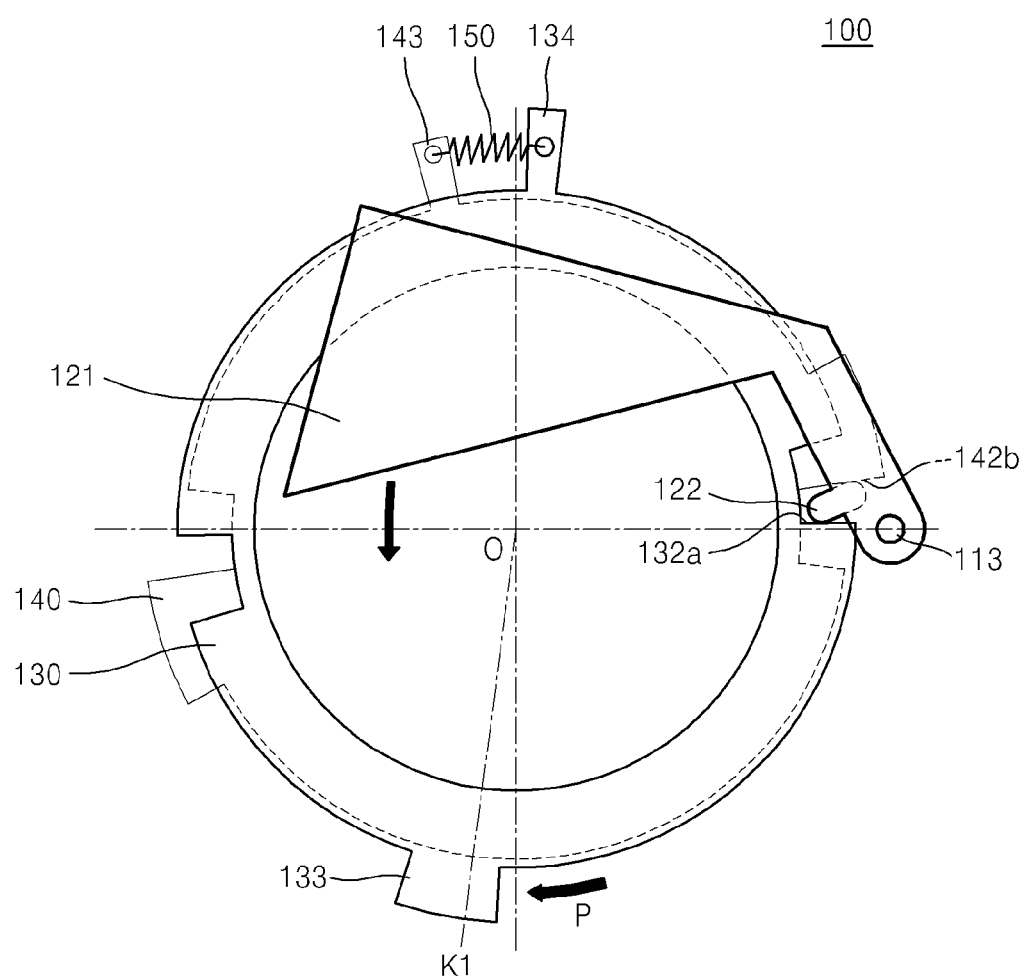
FIG. 10 is a plan view of the barrier of FIG. 4 changing from the opened state to a closed state, according to an embodiment of the invention.
Figure 11:
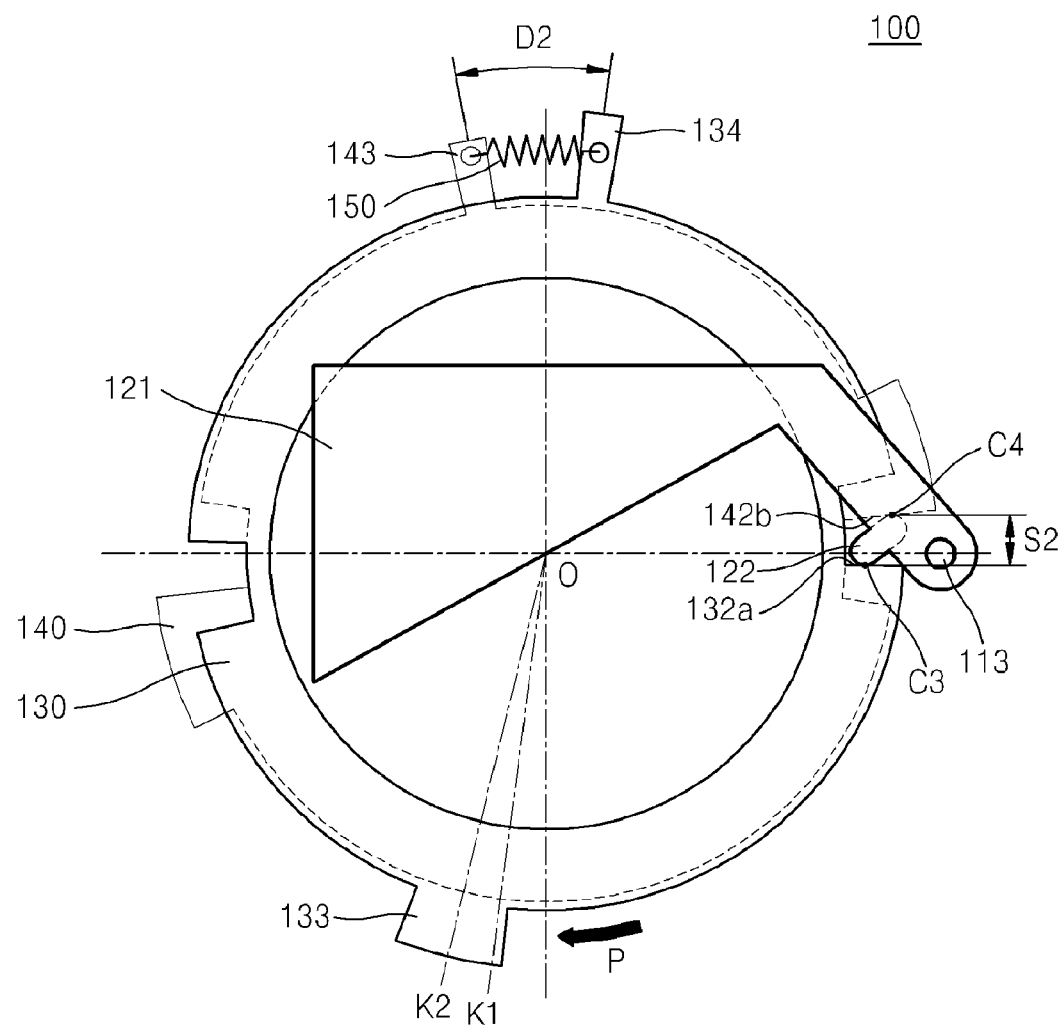
FIG. 11 is a plan view of the barrier of FIG. 4 in the closed state, according to an embodiment of the invention.
Figure 12:
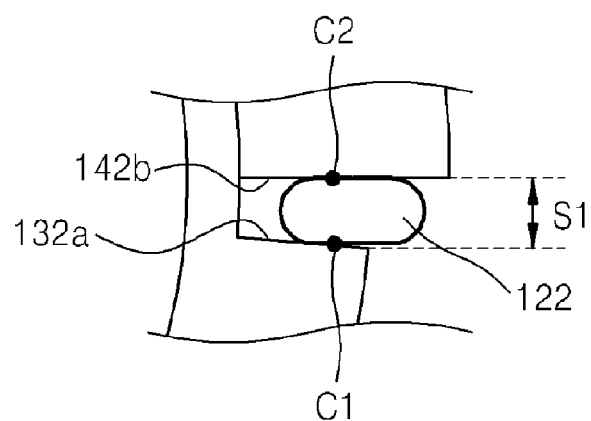
FIG. 12 is an enlarged cross-sectional view illustrating a relationship between the state of the insertion portion of FIG. 8 when the barrier is in the opened state and a first gap distance S1, according to an embodiment of the invention.
Figure 13:
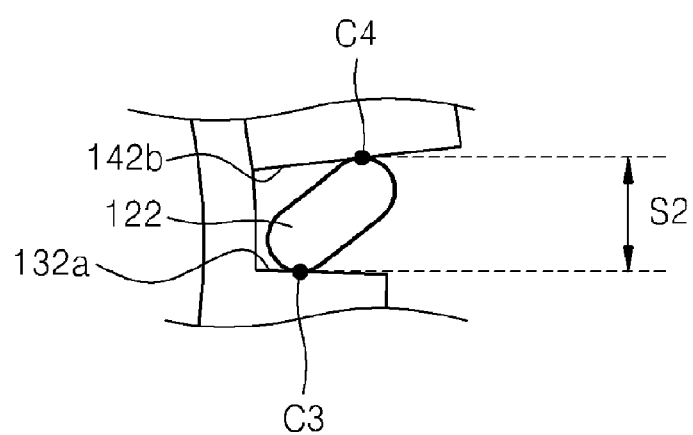
FIG. 13 is an enlarged cross-sectional view illustrating a relationship between the state of the insertion portion of FIG. 8 when the barrier is in the closed state and a second gap distance S2, according to an embodiment of the invention.
Figure 14:
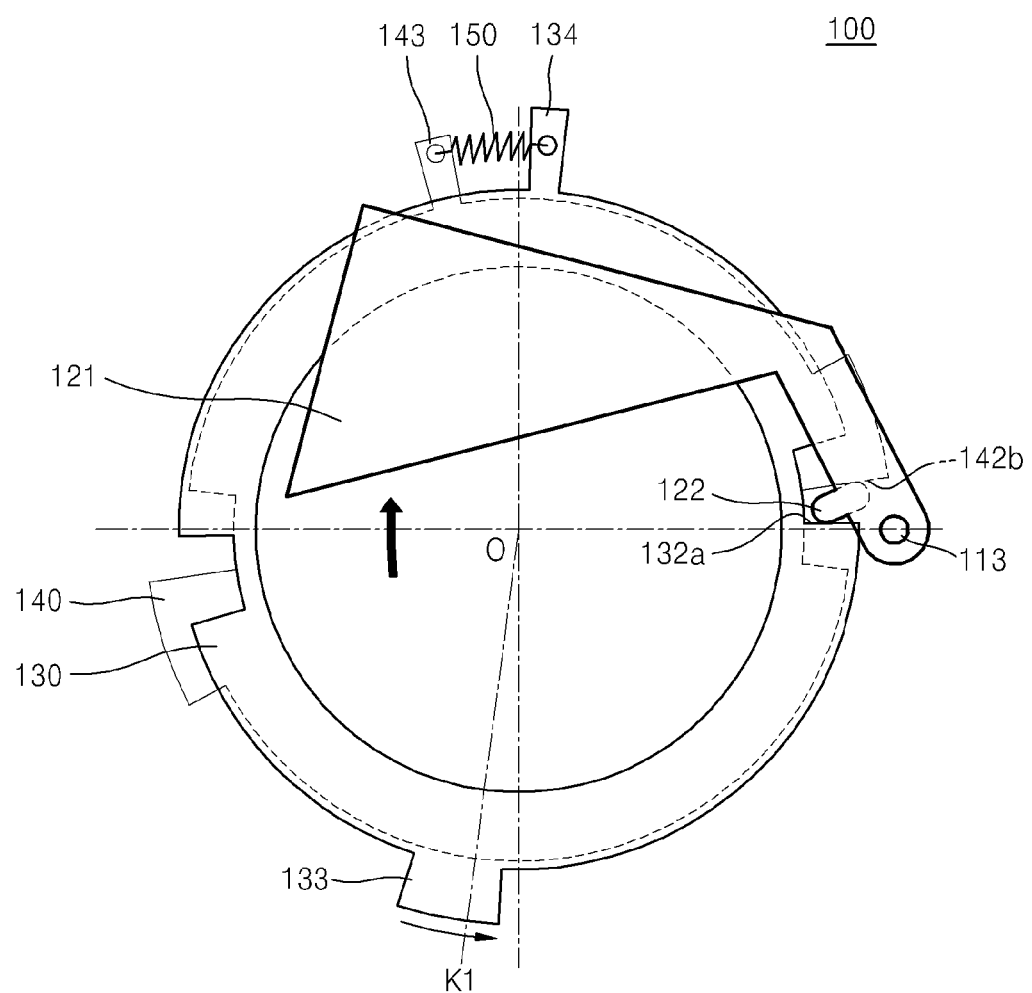
FIG. 14 is a plan view of the barrier of FIG. 4 changing from the closed state to the opened state, according to an embodiment of the invention.
Figure 15:
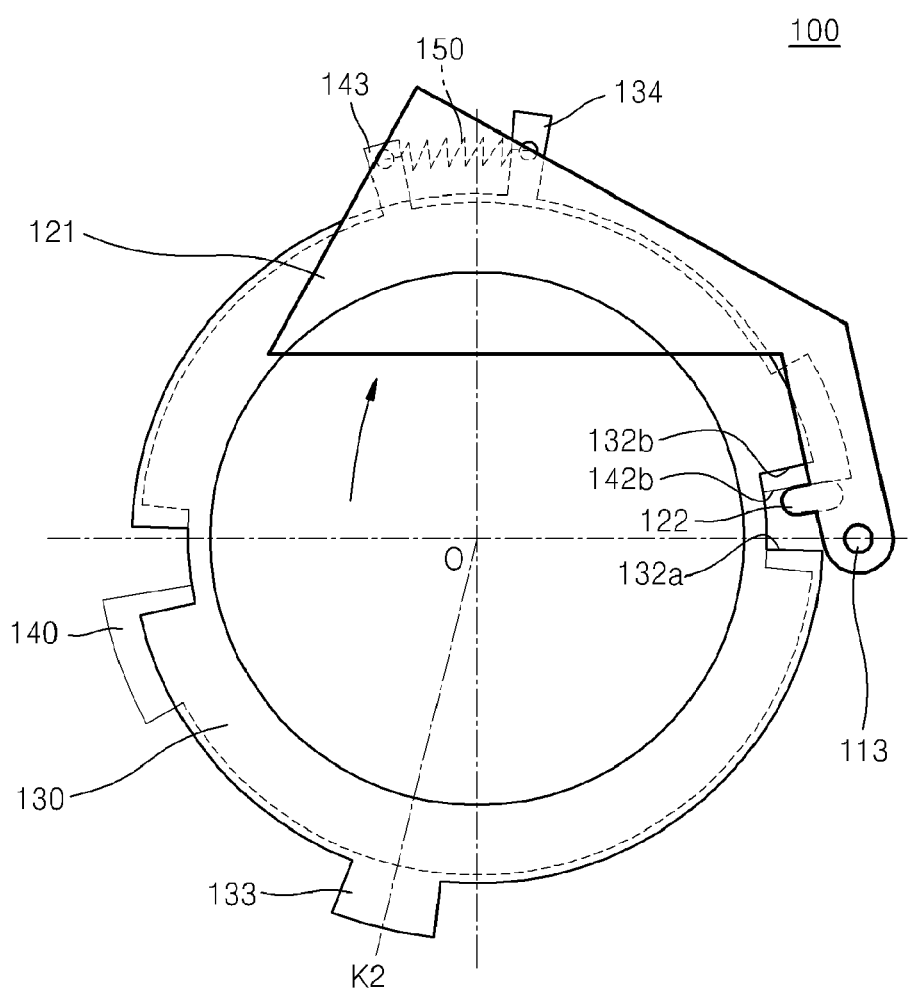
FIG. 15 is a plan view of the barrier of FIG. 4 forcibly opened, according to an embodiment of the invention.

FIG. 9 is a plan view of one of the barriers 120 in an opened state, according to an embodiment of the invention. FIG. 10 is a plan view of the barrier 120 changing from the opened state to a closed state, according to an embodiment of the invention. FIG. 11 is a plan view of the barrier 120 in the closed state, according to an embodiment of the invention. FIG. 12 is an enlarged cross-sectional view illustrating a relationship between the state of the insertion portion 122 of the barrier 120 when the barrier 120 is in the opened state and a gap distance S1, according to an embodiment of the invention. FIG. 13 is an enlarged cross-sectional view illustrating a relationship between the state of the insertion portion 122 when the barrier 120 is in the closed state and a gap distance S2, according to an embodiment of the invention. FIG. 14 is a plan view of the barrier 120 changing from the closed state to the opened state, according to an embodiment of the invention. FIG. 15 is a plan view of the barrier 120 forcibly opened, according to an embodiment of the invention.

FIGS. 9 through 15 illustrate only one of the two barriers 120 for convenience of explanation. However, as described above, when the opening/closing assembly 100 for the light path is opened or closed, the pair of barriers 120 simultaneously moves symmetrically with respect to each other. Since it would be obvious to one of ordinary skill in the art that descriptions regarding one barrier 120 may be applied to the other barrier 120, descriptions of an operation of the other barrier 120 (not shown) will not be provided here.

The opened state of the barrier 120 will be described.

The opened state of the barrier 120 is a state where the light path is opened when the barrier 120 has been rotated outwards, as illustrated in FIG. 9.

In the opened state of the barrier 120, an external force does not act on the functional portion 133 of the first driving member 130. When any force does not act on the functional portion 133, the functional portion 133 is disposed at a location K1, and the first driving member 130 is not rotated. In this case, the elastic member 150 is in an initial state, in which a tensile force does not act on the elastic member 150. The elastic member 150 has a length D1 in the initial state.

Also, when the barrier 120 is in the opened state, a distance between the first side 132a of the first engagement groove 132 contacting the insertion portion 122 and the second side 142b of the second engagement groove 142 contacting the insertion portion 122 is the gap distance S1. The gap distance S1 is a distance between the first side 132a contacting the insertion portion 122 and the second side 142b contacting the insertion portion 122 when the barrier 120 is in the opened state. In this regard, a portion of the first side 132a contacting the insertion portion 122 is C1, and a portion of the second side 142b contacting the insertion portion 122 is C2.

Next, a state where the barrier 120 is changing from the opened state to a closed state will be described.

Referring to FIG. 10, when the first driving member 130 is rotated clockwise by exerting an external force P on the functional portion 133 due to an internal function of the photographing apparatus 200, the first engagement groove 132 and the first elastic member mounting portion 134 are rotated clockwise.

When the first elastic member mounting portion 134 is rotated, the first end 151 of the elastic member 150 mounted on the first elastic member mounting portion 134 is rotated. If so, due to an elastic force from the elastic member 150, the second elastic member mounting portion 143 is rotated clockwise, and the second driving member 140 and the second engagement groove 142 are rotated clockwise.

As described above, since the insertion portion 122 of the barrier 120 simultaneously contacts the first side 132a of the first engagement groove 132 and the second side 142b of the second engagement groove 142, when the first engagement groove 132 and the second engagement groove 142 are moved nearly simultaneously clockwise, the insertion portion 122 also moves. The insertion portion 122 is rotated counterclockwise. If so, the barrier 120 is rotated counterclockwise and thus gradually enters into the closed state. Furthermore, the distance between the first side 132a contacting the insertion portion 122 and the second side 142b contacting the insertion portion 122 is varied.

When the barrier 120 is changed from the opened state to the closed state, due to the elastic member 150, contact between the insertion portion 122 and the second side 142b is stably maintained in spite of movement of the insertion portion 122.

When the functional portion 133 is continuously rotated and reaches a location K2, the barrier 120 is completely in the closed state and the light path is closed, as illustrated in FIG. 11.

When the barrier 120 is in the closed state, the distance between the first side 132a of the first engagement groove 132 and the second side 142b of the second engagement groove 142 is a gap distance S2. The gap distance S2 is a distance between the first side 132a contacting the insertion portion 122 and the second side 142b contacting the insertion portion 122 when the barrier 120 is in the closed state. In this regard, a portion of the first side 132a contacting the insertion portion 122 is C3, and a portion of the second side 142b contacting the insertion portion 122 is C4.

However, the gap distance S2 is greater than the gap distance S1 described above. This is because of rotation of the insertion portion 122 having an oval cross-section, which will be described with reference to FIGS. 12 and 13.

Referring to FIGS. 12 and 13, due to a position of the insertion portion 122, the gap distance S2 when the barrier 120 is in the closed state is greater than the gap distance S1 when the barrier 120 is in the opened state. Due to a difference between the gap distances S2 and S1, a distance between the first elastic member mounting portion 134 and the second elastic member mounting portion 143 when the barrier 120 is in the opened state is different from a distance between the first elastic member mounting portion 134 and the second elastic member mounting portion 143 when the barrier 120 is in the closed state.

If so, the length of the elastic member 150 when the barrier 120 is in the opened state is different from the length of the elastic member 150 when the barrier 120 is in the closed state. As described above, the length of the elastic member 150 when the barrier 120 is in the opened state, which is an initial state in which a tensile force is not exerted on the elastic member 150, as illustrated in FIG. 9 is D1, and the length of the elastic member 150 when the barrier 120 is in the closed state, which is a tensile state, as illustrated in FIG. 11 is D2 (D2>D1). In other words, when the barrier 120 is in the closed state, elastic energy is stored in the elastic member 150. The elastic energy stored in the elastic member 150 is released when the barrier 120 is changed from the closed state to the opened state, as will be described later.

Next, a state where the barrier 120 is changed from the closed state to the opened state will be described.

In the state of FIG. 11, when the force P exerted on the functional portion 133 due to the internal function of the cam member (not shown) of the photographing apparatus 200 (see FIG. 16) is removed and the location of the functional portion 133 is changed from the location K2 to the location K1, as illustrated in FIG. 14, the first elastic member mounting portion 134 and the first driving member 130 move counterclockwise. In this case, the insertion portion 122 is rotated clockwise, and the barrier 120 gradually enters into the opened state, as illustrated in FIG. 9. When the barrier 120 is changed from the closed state to the opened state in this manner, the distance between the first side 132a contacting the insertion portion 122 and the second side 142b contacting the insertion portion 122 is varied.

Also, when the barrier 120 is changed from the closed state to the opened state, the elastic member 150 releases stored elastic energy. In detail, as describe above, since the length D2 of the elastic member 150 when the barrier 120 is in the closed state is greater than the length D1 of the elastic member 150 when the barrier 120 is in the opened state, when the barrier 120 is changed from the closed state to the opened state, elastic energy that corresponds to a difference D2-D1 is released. If so, the location of the functional portion 133 may be easily changed, and contact between the insertion portion 122 and the second side 142b is stably maintained in spite of movement of the insertion portion 122.

Next, a forcibly-opened state where, while the barrier 120 is in the closed state (see FIG. 11) and the location of the functional portion 133 is maintained at the location K2, a user forcibly pushes on an outside of the barrier 120 to change the barrier 120 to the opened state will be described.

In the closed state, when the user pushes on the outside of the barrier 120 clockwise (in a direction of an arrow shown in FIG. 15) to rotate the barrier 120, the insertion portion 122 is rotated clockwise, and the barrier 120 is in a forcibly-opened state, as illustrated in FIG. 15. In this case, due to rotation of the insertion portion 122, the second side 142b of the second engagement groove 142 contacting the insertion portion 122 is rotated counterclockwise, and thus the second driving member 140 is rotated counterclockwise. In this case, even though the second driving member 140 is rotated, the first driving member 130 is not rotated but is maintained in its current state. In detail, in the forcibly-opened state, the functional portion 133 is still positioned at the location K2.

Thus, the distance between the first elastic member mounting portion 134 and the second elastic member mounting portion 143 increases, and the elastic member 150 is extended and stores elastic energy.

Then, when the user stops pushing on the barrier 120 in the forcibly-opened state, the elastic energy stored in the elastic member 150 is released, and the second driving member 140 is rotated clockwise due to a tensile elastic force. If so, the second side 142b of the second engagement groove 142 pushes the insertion portion 122 downwards, and thus the barrier 120 is in the closed state of FIG. 11.

In the present embodiment, the closed state of the barrier 120 is a state where the photographing apparatus 200 (see FIG. 16) is in an off state or a state for protecting a lens (not shown), and the opened state of the barrier 120 is a state where the photographing apparatus 200 (see FIG. 16) is in an on state or a photographing standby state. Thus, a designer designs the photographing apparatus 200 so that the functional portion 133 may move according to such an operation.

As described above, since the operations of opening, closing, and forcibly opening the barrier 120 can be securely performed and the opening/closing assembly 100 for the light path having a simple structure can be realized, manufacturing costs and the number of processes can be reduced. In particular, since the opening/closing assembly 100 for the light path includes a single elastic member 150, the number of assembling processes and manufacturing costs can be reduced.

Also, in the opening/closing assembly 100 for the light path, the operation of forcibly opening the barrier 120 can be easily performed due to rotational movement of the second driving member 140 without any burden on other elements.

The opening/closing assembly 100 for the light path has a structure for including the pair (two) of barriers 120. However, embodiments of the invention are not limited thereto. In detail, the number of barriers that constitute the opening/closing assembly 100 for the light path is not particularly limited. For example, the number of barriers 120 may be 1, 3, 4, or the like. In each case, design of the barrier base 110, the first driving member 130, the second driving member 140, and the elastic member 150 needs to be changed accordingly.

Figure 16:
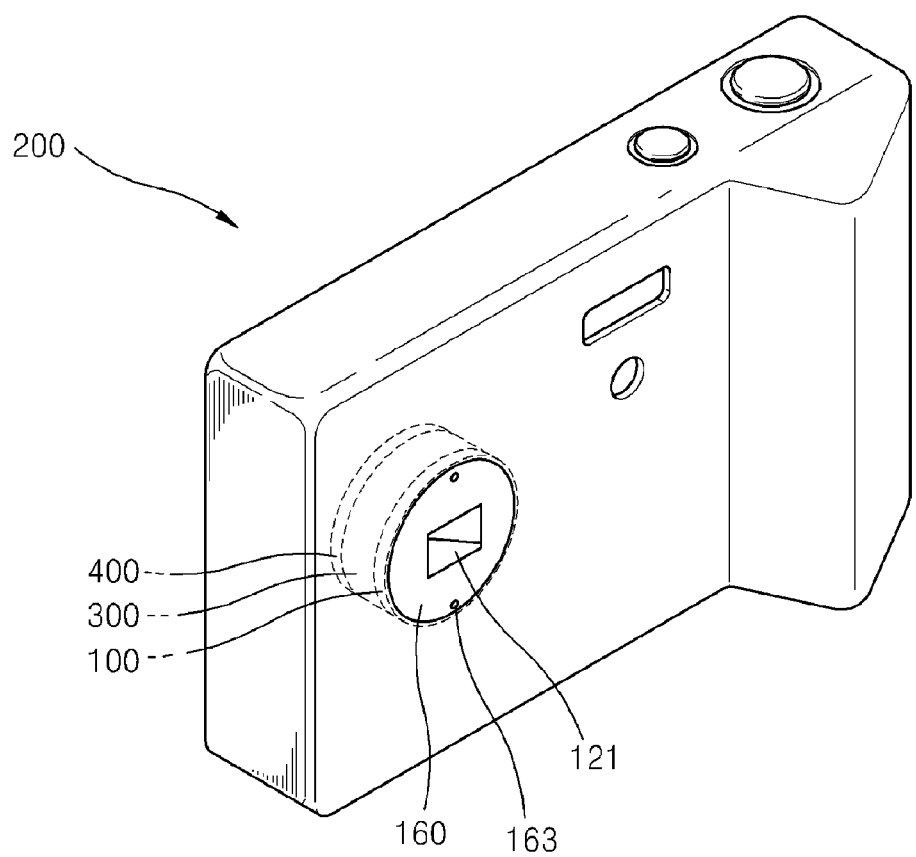
FIG. 16 is a schematic perspective view of a photographing apparatus including the opening/closing assembly for the light path of FIG. 1, according to an embodiment of the invention.

As illustrated in FIG. 16, the opening/closing assembly 100 for the light path may be applied to the photographing apparatus 200.

FIG. 16 is a schematic perspective view of the photographing apparatus 200 including the opening/closing assembly 100 for the light path of FIG. 1, according to an embodiment of the invention. Referring to FIG. 16, the photographing apparatus 200 includes the opening/closing assembly 100 for the light path, a lens unit 300 disposed behind the opening/closing assembly 100 for the light path and including a lens, and an imaging device 400 disposed behind the lens unit 300.

FIG. 16 illustrates a digital compact camera as the photographing apparatus 200. However, there are no other limitations in types of photographing apparatuses. For example, the photographing apparatus according to the invention may be any of a variety of types and formats of photographing apparatuses such as single-lens reflex cameras, image camcorders, film cameras, and the like.

As described above, in an opening/closing assembly for a light path, an opening/closing operation of a barrier can be securely performed using a simple structure of the opening/closing assembly for the light path.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. An opening/closing assembly for a light path, comprising:
    a barrier base having an opening for providing the light path;
    at least one barrier installed on the barrier base to be rotatable for opening/closing the light path, and comprising an insertion portion;
    a first driving member disposed on the barrier base and comprising at least one first engagement groove in which the insertion portion is inserted and a functional portion on which an external force is exerted;
    a second driving member disposed on the barrier base and comprising at least one second engagement groove in which the insertion portion is inserted; and
    an elastic member for elastically connecting the first driving member and the second driving member,
    wherein, when the at least one barrier is rotated, a distance between a portion of the first engagement groove contacting the insertion portion and a portion of the second engagement groove contacting the insertion portion is varied.

2. The opening/closing assembly for the light path of claim 1, wherein a hinge hole is formed in one of the barrier base and the barrier, and a hinge shaft to be inserted into the hinge hole is formed on the other one of the barrier base and the barrier.

3. The opening/closing assembly for the light path of claim 1, wherein a cross-section of the insertion portion is oval-shaped.

4. The opening/closing assembly for the light path of claim 1, wherein the insertion portion extends in a direction parallel to an optical axis of the light path.

5. The opening/closing assembly for the light path of claim 1, wherein the first driving member is ring-shaped.

6. The opening/closing assembly for the light path of claim 1, wherein the second driving member is ring-shaped.

7. The opening/closing assembly for the light path of claim 1, wherein:
    the first driving member comprises a first elastic member mounting portion;
    the second driving member comprises a second elastic member mounting portion;
    a first end of the elastic member is mounted on the first elastic member mounting portion; and
    a second end of the elastic member is mounted on the second elastic member mounting portion.

8. The opening/closing assembly for the light path of claim 1, wherein the elastic member is a tensile coil spring.

9. The opening/closing assembly for the light path of claim 1, wherein the distance between the portion of the first engagement groove contacting the insertion portion and the portion of the second engagement groove contacting the insertion portion when the barrier is in a closed state is greater than that when the barrier is in an opened state.

10. A photographing apparatus comprising:
    a lens unit;
    an imaging device for receiving image light from the lens unit;
    a barrier base disposed in front of the lens unit and having an opening for providing a light path of the image light;
    at least one barrier installed on the barrier base to be rotatable for opening/closing the light path, and comprising an insertion portion;
    a first driving member disposed on the barrier base and comprising at least one first engagement groove in which the insertion portion is inserted and a functional portion on which an external force is exerted;
    a second driving member disposed on the barrier base and comprising at least one second engagement groove in which the insertion portion is inserted; and
    an elastic member for elastically connecting the first driving member and the second driving member, wherein, when the at least one barrier is rotated, a distance between a portion of the first engagement groove contacting the insertion portion and a portion of the second engagement groove contacting the insertion portion is varied.

11. The photographing apparatus of claim 10, wherein a hinge hole is formed in one of the barrier base and the barrier, and a hinge shaft to be inserted into the hinge hole is formed on the other one of the barrier base and the barrier.

12. The photographing apparatus of claim 10, wherein a cross-section of the insertion portion is oval-shaped.

13. The photographing apparatus of claim 10, wherein the insertion portion extends in a direction parallel to an optical axis of the light path.

14. The photographing apparatus of claim 10, wherein the first driving member is ring-shaped.

15. The photographing apparatus of claim 10, wherein the second driving member is ring-shaped.

16. The photographing apparatus of claim 10, wherein:
the first driving member comprises a first elastic member mounting portion;
the second driving member comprises a second elastic member mounting portion;
a first end of the elastic member is mounted on the first elastic member mounting portion; and
a second end of the elastic member is mounted on the second elastic member mounting portion.

17. The photographing apparatus of claim 10, wherein the elastic member is a tensile coil spring.

18. The photographing apparatus of claim 10, wherein the distance between the portion of the first engagement groove contacting the insertion portion and the portion of the second engagement groove contacting the insertion portion when the barrier is in a closed state is greater than that when the barrier is in an opened state.

* * * * *